United States Patent Office 3,730,729
Patented May 1, 1973

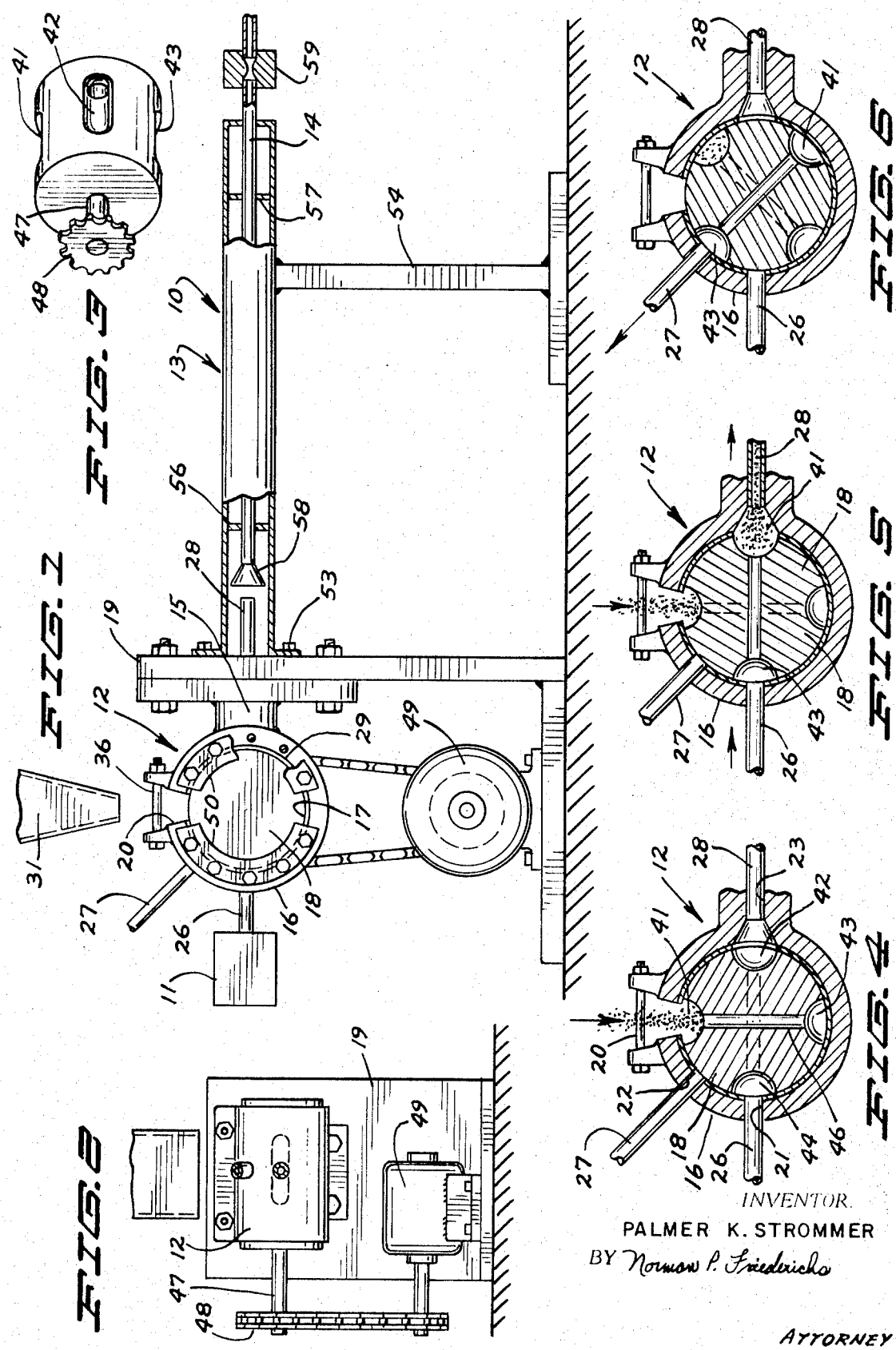

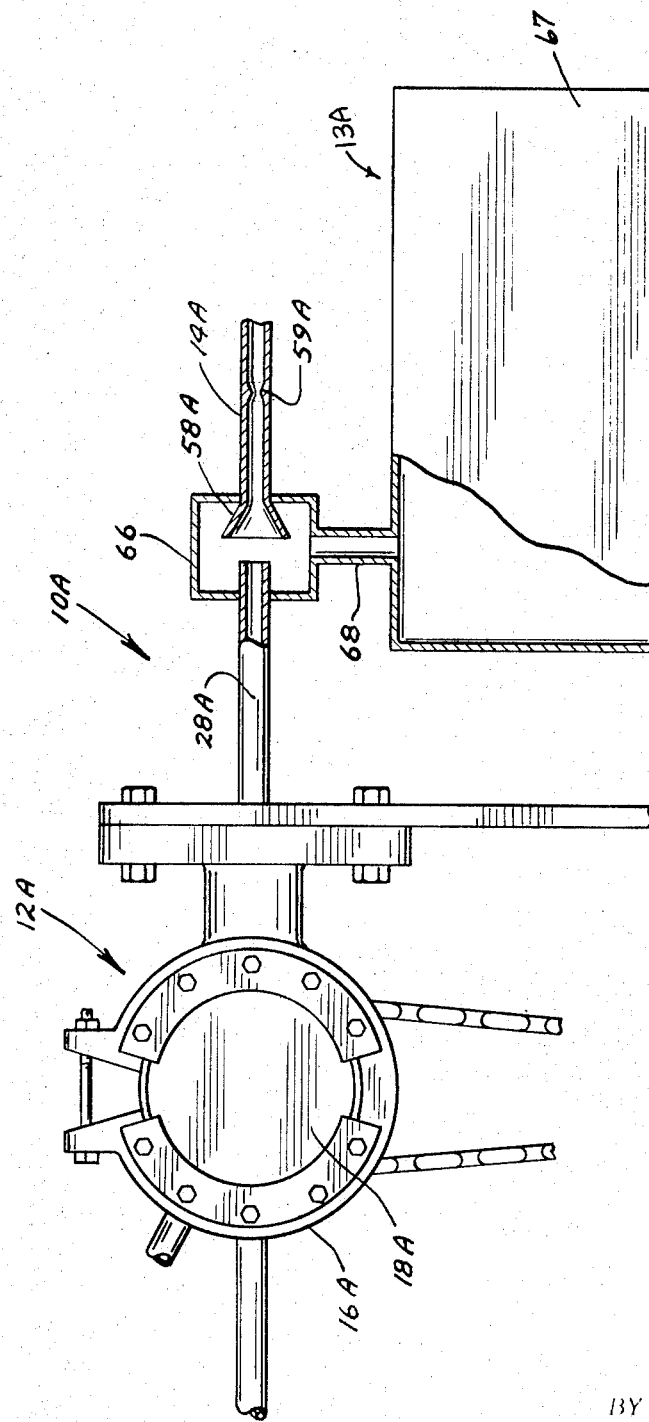

3,730,729
CONTINUOUSLY PUFFING FINELY-DIVIDED
PARTICULATE FOOD MATERIALS UTILIZING OPPOSING STEAM FORCES
Palmer K. Strommer, Osseo, Minn., assignor to General Mills, Inc.
Filed July 27, 1970, Ser. No. 58,318
Int. Cl. A23g 1/04; A23l 1/10, 1/12
U.S. Cl. 99—26
22 Claims

ABSTRACT OF THE DISCLOSURE

Heat and pressure reactive particulate food materials such as cereal flour, cocoa powder, potato flour, or finely-divided protein containing materials are treated in an apparatus wherein the food material is propelled through a treatment zone containing steam at a pressure of between about 15 p.s.i.g. and 110 p.s.i.g. by a steam flow which itself is at a pressure of at least 15 p.s.i.g. and a temperature of between 250° F. and 500° F. Once the food material passes through the treatment zone it is then carried into a zone of lower pressure. The opposing forces on the food material from the flow of steam and the steam pressure in the treatment zone result in the material being either puffed, texturized, gelatinized, homogenized or agglomerated.

The present invention relates to processing of food materials and more particularly to processing of such materials under heat and pressure.

In the past, particulate material has been treated under heat and pressure using various types of apparatus and methods. Starch materials, for example, have been gelatinized by forming a dough and then treating the dough in an extruder or puffing gun. The known methods and apparatus, however, have not been suitable for treating material in the form of fine particulate material such as flour.

The present invention provides a method and apparatus suitable for treating fine particulate material under relatively mild conditions. For example, the residence time of the material in the apparatus of the present invention may be less than one second. The material being treated in the present invention is not mechanically worked. The material being treated in many instances may remain in a fine particulate form throughout the treatment and thus eliminate any need for grinding following the treatment.

The materials that may be treated according to the present invention are many and varied and includes any material that is reactive in the presence of the heat and pressure of the present invention. The reaction that takes place may be either a chemical or a physical reaction. Processing of the present invention includes one or more of the following: gelatinization, texturization, puffing, homogenizing and agglomerating. One illustrative class of materials processed according to the present invention includes the cereal flours and mixtures of cereal flours with other materials. The cereal flours typically include wheat flour, corn flour, rice flour, tapioca and the like. Other similar starchy fine particulate material includes typically potato flour. One reaction that takes place when such starchy materials are subjected to the heat and pressure is gelatinization.

Another class of reactive materials that may be treated according to the present invention is protein materials. A surprising result is obtained in this instance, namely, texturization. This process of texturization is separately described and claimed in patent application S.N. 58,317, entitled, "Method for Texturizing Protein Material," filed on even date herewith. This class typically includes the various defatted oil seed meals and flours such as soybean, peanut, cottonseed and sesame. This class further includes the protein concentrates and isolates of such defatted oil seed materials, as well as various other untextured protein materials such as gluten, yeast, sodium caseinate and the like. The reaction that takes place when the untextured protein materials are treated according to the present invention is texturization. The untexturized protein material contains the protein as discrete particles in a continuous phase of starch. The protein acquires a substantially continuous phase as texturization takes place. Such texturized protein, when moist, is somewhat tough or chewy much like meat.

A further class of reactive materials that may be treated according to the present invention includes those materials that may be homogenized. This class includes the oil containing materials such as finely ground dutched cocoa. The fat is normally present in cocoa powder as fat globules. In the process of the present invention the fat globules are broken up and uniformly distributed throughout the powder particle thereby providing a dark cocoa product. The processed cocoa material dispenses more readily in water than does the untreated cocoa powder. The cocoa is also agglomerated and puffed. A sugar and flour mixture may also be homogenized. The sugar is believed to melt and become uniformly spread on the surface of the flour.

Apparatus of the present invention is shown in the drawings as follows:

FIG. 1 ishows a side view of the apparatus with portions broken away.

FIG. 2 shows an end view of the apparatus.

FIG. 3 shows a portion of a valve of the apparatus.

FIGS. 4-6 show cross sectional views of the valve in various positions of operation.

FIG. 7 shows alternative apparatus that may be used in carrying out the present invention.

The apparatus 10 (FIG. 1) may include a rotary valve 12, a pressure tank 13 and a tube or processing chamber 14. The apparatus 10 is connected to a high pressure gaseous fluid source 11 such as a steam boiler which should be capable of providing pressure, for example, of at least 15 p.s.i.g. to the rotary valve 12. The high pressure gaseous fluid has a high heat transfer coefficient. The gaseous fluid may include steam.

The rotary valve 12 may include a valve housing 16 with an opening or chamber 17 for reception of the rotary valve member or plug 18. The valve housing 16 has a base 15 for support of the valve 12 on bracket 19. The valve housing 16 has an upper opening 20 which serves as an inlet for material to be treated. The housing 16 (FIG. 4) further includes openings 21, 22 and 23 for reception of pipes 26, 27 and 28, respectively. The pipes, for example, may be threadedly engaged in said openings. The pipe 26 is connected to the steam source 11 and feeds the pressurized steam to the valve 12. Pipe 27 is an exhaust pipe which depressurizes any residual steam pressure in valve 12 prior to feeding of protein material to the valve 12 through opening 20. Pipe 28 is the outlet through which the reactive materal leaves valve 12. A hopper 31 (FIG. 1) may be provided for feeding material to opening 20 in valve 12. The housing 16 has a bearing member 29 located in chamber 17 for rotatable support of the valve member 18. The bearing member 29 extends substantially around chamber 17 except for suitable openings which cooperate with openings 20, 21, 22 and 23 in housing 16. The valve housing 16 has a tightening means such as a bolt or screw 36 for drawing the housing 16 and bearing 29 tightly against the rotary valve member 18 thereby providing a steam seal between bearing 29 and the rotary valve member 18. The bearing 29 may be constructed from a brass cylinder.

The rotary valve member 18 (FIGS. 2–6) may be of steel and may be constructed from a solid cylinder or alternatively it may be formed by casting. The member 18 is provided with any desired number of material conveying pockets such as 41, 42, 43 and 44. The member 18 will normally have an even number of such pockets, typically four, six or eight. A passageway 46 is provided between each pair of pockets such as pockets 41 and 43, for purposes hereinafter described. The rotary valve member 18 has a shaft 47 and a sprocket 48 for driven engagement with suitable power means such as motor 49 (FIG. 1). The valve member 18 may be held in position in housing 16 by restraining plates, such as plate 50 which is secured to housing 16 by screws.

The pressure tank or surge tank 13 and the tube 14 in the embodiment shown in FIG. 1 are concentric pipes. The pressure tank 13 may be secured to the support bracket 19 by flange 53. The pressure tank 13 may be further supported by one or more legs such as leg 54. The pressure tank 13 is sealed from the atmosphere except through tube 14. The tube 14 is mounted in pressure tank 13 such as by spider flanges 56 and 57. If desired, a portion 58 of tube 14 nearest to valve 12 may be flared radially outwardly for ready reception of the material from pipe 28. Space is provided between the outermost edge of flared portion 58 and the adjacent wall of pressure tank 13 so that the pressure may equalize throughout tank 13.

The tube 14 may have a restricted orifice or nozzle 59 which limits the escape of pressure from the apparatus 10 thereby providing a build up of pressure in the tank 13. Alternatively the diameter of the tube 14 may be sufficient restriction to provide the necessary build up of pressure. The restriction should be sufficient to maintain a minimum pressure of at least about 15 p.s.i.g. in the pressure tank 13.

An alternative type of apparatus 10A that may be used in the present invention is disclosed in FIG. 7. The apparatus 10A may include a rotary valve 12A constructed substantially as discussed with respect to valve 12 of apparatus 10. The valve 12A includes a housing 16A, a rotary valve member 18A and an outlet pipe 28A. The tube 14A is relatively short in this embodiment and includes a flared portion 58A and a nozzle 59A. The pressure tank 13A in this embodiment has a first small compartment 66 which surrounds adjacent portions of the outlet pipe 28A and tube 14A. The first compartment 66 is connected to a second larger compartment or pressure source 67 by a pipe 68. The pipe 68 may be of any desired length and diameter so long as the pressure remains adequate (i.e., at least 15 p.s.i.g.) in compartments 66 and 67. This embodiment permits flexibility in utilization of equipment space. For example, the valve 12A and small compartment 66 may be located in one area and the larger compartment may be located in another area. If desired, a secondary high pressure gaseous source may be applied to either compartment 66 or compartment 67 in order to provide or assist in maintenance of appropriate pressure levels.

The method of the present invention is substantially the same if it is carried out using the apparatus 10 or apparatus 10A; therefore, the method will be described as being carried out using apparatus 10.

The reactive material may be added to the apparatus 10 such as through the hopper 31. If desired, suitable provision may be made for metering or controlling the amount of feed material passing through the hopper 31. The feed material leaving hopper 31 falls through opening 20 in the housing 16 of valve 12 thus being deposited, for example, in pocket 41 as shown in FIG. 4. The valve member 18 rotates in a clockwise direction such that pocket 41 aligns with pipe 28 and pocket 43 aligns with steam pipe 26 in FIG. 5. At that point, the residual pressure in tank 13 and the pressure from steam pipe 26 act on the reactive material. The pressure exerted by the pressure tank 13 may be about 15 p.s.i.g. or more and is generally at least 55 p.s.i.g., preferably, 80 to 110 p.s.i.g. The moisture content of the food material will generally be at least 4% by weight, preferably 16 to 26% and more preferably 18 to 24%. The pressure exerted through pipe 26 by the steam source 11 should be enough greater than the pressure exerted by the tank 13 that the reactive material is rapidly forced through pipe 28, tube 14 and nozzle 59. The temperature of the steam fed to the valve 12 will usually be at least 250° F. and commonly 400 or 500° F. It is believed that usually the treatment takes place immediately upon application to the reactive material of the force from both the steam pipe 26 and the surge tank 13. In any event the material is reacted by the time it leaves the nozzle 59. Steam pressure continues to pass through valve 12 and pipe 28 for an instant following expulsion of the reactive material from pipe 28. This raises the pressure in tank 13. Of course, some pressure is lost through the tube 14 and nozzle 59 for an instant following expulsion of the reactive material from nozzle 59. However, the proper pressure is maintained in tank 13 because of the reduced orifice in nozzle 59. It has been found that the protein material, for example, fails to texturize appreciably if the back pressure from the pressure tank 13 is reduced to below 15 p.s.i.g. The valve member 18 continues to rotate and pocket 43 aligns with exhaust pipe 27 and residual pressure in pockets 41, 43 and passageway 46 is relieved. Pocket 43 then reaches the feed port and is loaded with material to be reacted. The operational process then continues as described with respect to reaction in the pocket 41. Reaction takes place in pockets 42 and 44 substantially as described with respect to pockets 41 and 43. The valve member 18 may be rotated at any desired speed depending upon such things as the size of the pockets, the number of pockets and the feed rate of reactive material.

The following examples are illustrative of the present invention and are not intended for purposes of limitation.

EXAMPLE I

Wheat flour (second clears) was treated according to the present invention for the purpose of gelatinizing the starch in the flour. The wheat flour was fed to the processing apparatus 10 at the rate of 4.5 pounds per minute. The density of the feed material was 132 grams per cup and the moisture content was 10 to 12%. The steam was fed to the rotary valve 12 at a temperature of 525° F. and a pressure of 180 p.s.i.g. The pressure in the surge tank was 120 p.s.i.g. The product was found to have a starch damage of 92% and a density of 81 grams per cup, thus showing that the material was gelatinized and expanded. The gelatinized wheat flour was suitable for the preparation of dog food.

EXAMPLE II

Semolina was processed according to the present invention for the purpose of gelatinizing the starch in the semolina. The semolina was fed to the processing apparatus 10 at the rate of 10 pounds per minute. The reactive feed material had a moisture content of 12.2% and a density of 167.8 grams per cup. The steam was fed to the rotary valve 12 at a temperature of 525° F. and a pressure of 180 p.s.i.g. The pressure in the surge tank 13 was 120 p.s.i.g. The reacted product had a moisture content of 7%, starch damage of 89% and a density of 53.2 grams per cup. The gelatinized semolina was extruded to form quick cooking macaroni using conventional techniques. The macaroni was found to hydrate quickly and produce an acceptable macaroni product.

EXAMPLE III

Semolina was processed as described in Example II except that the steam was fed to rotary valve 12 at a temperature of 500° F. and a pressure of 180 p.s.i.g. The pressure in tank 13 was 150 p.s.i.g. The product had a moisture content of 7%, a starch damage of 90%, and a density of 42 grams per cup, thus showing that the material was dehydrated, gelatinized and expanded. The product was used to prepare quick cooking macaroni.

EXAMPLE IV

Protein material was processed according to the present invention for purposes of texturizing the protein. A dry blended mixture was prepared containing 140 parts soy flour (Textrol® [1]), 60 parts protein isolate (Promine R® [2]), 1 part glycerol mono stearate (Myvaplex 601® [3]) and 2 parts caramel color. The term "parts" as used herein will refer to parts by weight on an as is moisture basis, the moisture normally being about 6%. The total moisture content of the mixture was raised to 20% by weight. The moistened flour-like mixture was fed to the apparatus 10 at the rate of about 10 pounds per minute. The steam was fed to the rotary valve at a temperature of 450° F. and a pressure of 120 p.s.i.g. The pressure in the tank 13 was maintained at about 70 p.s.i.g. plus or minus 4 p.s.i.g. The material leaving the nozzle was well textured and had a moisture content of about 17.5%. The textured material was ground with a Comitrol Cutter®, hydrated by soaking in water for 20 minutes and mixed with hamburger in a 1:4 ratio, by weight. The texturized material was found to provide a satisfactory extender for meat.

EXAMPLE V

Texturized protein material was prepared according to the present invention from cottonseed flour. The flour was defatted, glandless cottonseed flour produced by Producers Cooperative Oil Mill and contained about 60% protein. The total moisture content of the flour was raised to 17%. The flour was fed to the apparatus 10 at the rate of 2 to 3 pounds per minute. Steam was fed to the rotary valve 12 at a temperature of 430° F. and a pressure of 180 p.s.i.g. The pressure in the surge tank was maintained between 90 and 100 p.s.i.g. The material leaving the apparatus 10 was well textured and suitable for use as a meat extender.

EXAMPLE VI

Texturized protein material was prepared according to the present invention from yeast flour. The yeast flour was obtained from Northwest Brewers Yeast, Inc. The yeast flour was milled in a Jet-O-Mizer® using dry air at a pressure of 80 p.s.i.g. in order to break up the yeast cells. The total moisture of the yeast flour was raised to 20.5%. The jet milled yeast flour was wed to the apparatus 10 at the rate of about 8 pounds per minutes. The steam was fed to the valve 12 at a temperature of about 450° F. and a pressure of 130 p.s.i.g. The pressure in the tank 13 was maintained at about 80 p.s.i.g. The material leaving the apparatus 10 was found to be well textured and suitable for use as a meat extender.

EXAMPLE VII

Texturized protein material was prepared from sodium caseinate obtained from Land O' Lakes Creameries, Inc. The moisture content of the sodium caseinate was about 5% when fed to the apparatus 10. The feed rate of sodium caseinate was between 2 and 3 pounds per minute. Saturated steam was fed to the rotary valve at a temperature of 350° F. The product was found to be well textured and suitable for use as a meat extender.

[1] Textrol is a processed soy protein material having a minimum protein content of 63.5% and produced by Central Soya Co. Inc.
[2] Promine R is an isolated soy protein material having a protein content of about 95% and produced by Central Soya Co. Inc.
[3] Myvaplex 601 is a food grade concentrated glycerol mono stearate produced by DPI Division of Eastman Chemical Products, Inc.

EXAMPLE VIII

Texturized protein material was prepared from gluten under the following conditions: gluten feed rate 6 to 8 pounds per minute; moisture content of feed material about 5%; steam feed temperature 450° F.; surge tank pressure 100 p.s.i.g. A well textured product was obtained.

EXAMPLE IX

Simulated beef chunks were prepared according to the present invention by dry blending 70 parts soy flour (Textrol®), 30 parts soy isolate (Promine R®), 2 parts sugar, 3 parts onion powder, 3 parts caramel, 6 parts hydrolyzed protein flavoring (beef flavor) and 0.3 part red coloring. The moisture content was raised to 19%. The material was fed to the apparatus 10 at a rate of about 7 pounds per minute. The steam fed to the rotary valve 12 was at a pressure of 120 p.s.i.g. and a temperature of 430° F. The pressure in tank 13 was maintained at 95 p.s.i.g. The material leaving the apparatus 10 was well textured. The pieces were soaked in water for 20 minutes. The pieces had a beef-like flavor.

EXAMPLE X

Cocoa powder was processed according to the present invention for purposes of homogenizing and instantizing the powder. The cocoa powder was Baker's Cocoa Powder (Dutched)®. The moisture content of the feed material was 4.3% and the density was 106 grams per cup. The cocoa powder feed rate was about 1 to 3 pounds per minute. The steam fed to the valve 12 was saturated and had a temperature of about 350° F. and a pressure of 120 p.s.i.g. The pressure in tank 13 was 80 p.s.i.g. The product was substantially darker than the feed material and had a density of 81 grams per cup. The product had a moisture content of 17.8%. The product dispersed in water more readily than did the feed material. The oil was found to be very uniformly distributed throughout the product.

EXAMPLE XI

Pregelatinized potato flour was prepared according to the present invention. Dehydrated diced potatoes were processed in a hammer mill and then the moisture content was raised to about 18%. The potato material was fed to the apparatus 10 at the rate of about 3 pounds per minute. The steam was fed to the rotary valve 12 at a temperature of 425° F. and a pressure of 180 p.s.i.g. The pressure in the tank 13 was 100 p.s.i.g. The product was found to be gelatinized.

The embodiments of the invention in which an exclusive property or privilege is claimed are defined as follows:

1. A method for treating finely-divided, particulate, heat and pressure reactive food material selected from the group consisting of cereal flour, cocoa, powder and finely-divided, particulate material in an area having a steam pressure of at least 15 p.s.i.g. and a temperature of at least 250° F., said material during said treating being propelled solely by a flow of steam in a confined path, said steam flow carrying said material into said area, through said area and then out of said area into a zone of lower pressure such that the particulate material is subjected to opposing forces from said flow of steam and said steam pressure in said area.

2. The method of claim 1 wherein the zone of lower pressure is at atmospheric pressure.

3. The method of claim 1 wherein the material is a finely-divided, oil containing cocoa powder.

4. A method for continuously processing powdered particulate heat and pressure reactive food material comprising: feeding said material into a processing chamber; simultaneously feeding a gaseous fluid having a high heat transfer coefficient into said chamber from two sources thereby pressurizing said chamber to at least 15 p.s.i.g.; one of said sources being of sufficient pressure to force the material from said chamber into a zone of reduced temperature and pressure, said one source being steam at a temperature of at least 250° F.

5. A method for treating powdered heat and pressure reactive starch containing food material comprising: feeding particles of said material to a processing zone, simultaneously feeding a heated pressurized gaseous processing fluid including steam into said zone at a rate sufficient to carry said starch material through said zone, the temperature of said gaseous fluid being at least 250° F. and the pressure in said zone being at least 15 p.s.i.g. and removing said starch containing material from said processing zone.

6. The method of claim 5 wherein said pressure is at least 55 p.s.i.g.

7. The method of claim 6 wherein the temperature of said gaseous fluid is sufficient to gelatinize the starch in said starch containing food material.

8. The method of claim 5 wherein the gaseous fluid consists of super-heated steam.

9. A method for processing particulate food material comprising: feeding heat and pressure reactive particulate food material to a confined elongated treating zone, said zone having a gaseous fluid pressure of at least 55 p.s.i.g.; subjecting said particulate material to said fluid pressure; and simultaneously subjecting said particulate material to a steam flow at a temperature of at least 250° F. and of sufficient magnitude to propel the particulate material through the pressurized treating zone.

10. A method for treating finely-divided heat and pressure reactive food material comprising: feeding said material to the inlet of a treating chamber, said chamber comprising an elongated cylinder having an inlet at one end and an outlet at the other end, said chamber having a gaseous pressure of at least 15 p.s.i.g., subjecting said particulate material in said inlet with force exerted by said pressurized gaseous fluid from the direction of said chamber and by a flow of gaseous fluid having a high heat transfer coefficient from the direction of said inlet toward said outlet, the temperature of said gaseous flow being at least 250° F., said flow being of sufficient force to propel said material through said elongated cylinder and out of said outlet.

11. The method of claim 10 wherein the food material has a moisture content of at least 4% by weight.

12. The method of claim 11 wherein the food material has a moisture content of between 16 and 26% by weight.

13. The method of claim 10 wherein the pressure is at least 55 p.s.i.g.

14. The method of claim 13 wherein the temperature and pressure in said chamber is sufficient that the material is expanded during processing.

15. The method of claim 13 wherein the material is a starch containing material and wherein the method includes the step of gelatinizing said starch.

16. The method of claim 13 wherein the material is an oil containing material and wherein the temperature and pressure in said chamber is sufficient to produce homogenization during processing.

17. The method of claim 16 wherein the material is cocoa and wherein the cocoa is agglomerated during processing.

18. The method of claim 10 wherein the material includes 18 to 24% total moisture and wherein said pressure is in the range of 80 to 110 p.s.i.g.

19. Apparatus for processing heat and pressure reactive particulate material comprising: elongated discontinuous cylinder means including spaced first and second cylinder portions; said cylinder means having inlet powder feeding means adjacent a first end of said cylinder means and outlet means adjacent the other end of said cylinder means; means for maintaining a fluid pressure in said cylinder means; means for applying a fluid pressure to a zone between the portions of said cylinder means; and means for applying a steam flow force to the reactive particulate material in said inlet feeding means sufficient to force the reactive particulate material through said elongated pressurized cylinder means and out of said outlet means.

20. The apparatus of claim 19 wherein said inlet feeding means includes a rotary valve.

21. The apparatus of claim 20 wherein said outlet means includes a restrictive orifice.

22. The apparatus of claim 19 wherein said fluid pressure means comprise a pressurized tank exerting fluid pressure to the zone between the portions of said discontinuous cylinder.

References Cited

UNITED STATES PATENTS

| 3,272,110 | 9/1966 | Tsuchiya | 99—238 R |
|---|---|---|---|
| 3,288,053 | 11/1966 | Perttula | 99—238 R |
| 2,278,468 | 4/1942 | Musher | 99—98 |
| 2,478,438 | 8/1949 | Thompson et al. | 99—82 |
| 3,505,076 | 4/1970 | Maloney et al. | 99—81 |
| 2,701,200 | 2/1955 | Huber | 99—81 |
| 3,661,071 | 5/1972 | Toei et al. | 99—81 X |
| 3,637,400 | 1/1972 | Muller et al. | 99—98 X |

S. LEON BASHORE, Primary Examiner

R. H. TUSHIN, Assistant Examiner

U.S. Cl. X.R.

99—14, 81, 93, 99, 236 CC, 238 R